(12) United States Patent
Aggarwal

(10) Patent No.: US 11,430,033 B2
(45) Date of Patent: Aug. 30, 2022

(54) METHODS AND SYSTEMS OF UTILIZING MACHINE LEARNING TO PROVIDE TRUST SCORES IN AN ONLINE AUTOMOBILE MARKETPLACE

(71) Applicant: Sandeep Aggarwal, gurgaon (IN)

(72) Inventor: Sandeep Aggarwal, gurgaon (IN)

( * ) Notice: Subject to any disclaimer, the term of this patent is extended or adjusted under 35 U.S.C. 154(b) by 0 days.

(21) Appl. No.: 16/587,046

(22) Filed: Sep. 29, 2019

(65) Prior Publication Data

US 2020/0160417 A1 May 21, 2020

Related U.S. Application Data

(63) Continuation-in-part of application No. 15/292,111, filed on Oct. 12, 2016, now abandoned.
(Continued)

(51) Int. Cl.
*G06Q 30/06* (2012.01)
*G06Q 30/02* (2012.01)
(Continued)

(52) U.S. Cl.
CPC ........ *G06Q 30/0609* (2013.01); *G06K 9/6256* (2013.01); *G06N 20/00* (2019.01);
(Continued)

(58) Field of Classification Search
CPC ................. G06Q 30/0601–0645; G06Q 30/80
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 8,005,759 B2 * | 8/2011 | Hirtenstein | G06Q 30/0283 705/306 |
| 2007/0162293 A1 * | 7/2007 | Malkon | G06Q 99/00 705/306 |

(Continued)

*Primary Examiner* — Nicholas D Rosen

(57) ABSTRACT

In one example aspect, a computerized method includes the step of providing an item listing. The item listing is listed in an e-commerce marketplace. The computerized method includes the step of identifying the item listing into a set of listing parameters. A listing parameter includes one or more listing images and one or more terms that are descriptive of the item listing. The computerized method includes using the listing parameters to do the following steps. The computerized method determines a trust score for the item listing. The trust score is based on a number of images of an item in the item listing. The computerized method a quality score of the number of images; a description score of a description of the item. The computerized method determines a pricing score. The pricing score is based on a percentage variation from a geographically relevant item valuation and an item research service, and a condition of the item. The computerized method determines a seller score. The seller score is based on the verified status of the seller, a seller rating of the seller, and a percentage of positive feedback. The computerized method determines a health score. The health score is based on a seller declaration, a service logs, a verification that the item is insured, and a verification that the item properly registered.

5 Claims, 10 Drawing Sheets

Related U.S. Application Data

(60) Provisional application No. 62/407,497, filed on Oct. 12, 2016, provisional application No. 62/239,975, filed on Oct. 12, 2015.

(51) Int. Cl.
*G06K 9/62* (2022.01)
*G06N 20/00* (2019.01)

(52) U.S. Cl.
CPC ..... *G06Q 30/0206* (2013.01); *G06Q 30/0633* (2013.01); *G06Q 30/0639* (2013.01); *G06Q 30/0641* (2013.01)

(56) References Cited

U.S. PATENT DOCUMENTS

2008/0046383 A1* 2/2008 Hirtenstein ........ G06Q 30/0283
705/400
2017/0337573 A1* 11/2017 Toprak ................... G07C 5/006

* cited by examiner

```
┌─────────────────────────────────────────────────────────────────────────┐
│ BASED ON HISTORICAL SALES DATA, WEIGHT ASSIGNMENTS OF LISTING PARAMETERS VALUES │
│        ARE CALCULATED USING MULTIVARIATE REGRESSION MODELING            │
│                                  1002                                   │
└─────────────────────────────────────────────────────────────────────────┘
                                    │
                                    ▼
┌─────────────────────────────────────────────────────────────────────────┐
│          SPLIT THE DATA SET INTO A TRAINING SET(S) AND A TEST SET(S)    │
│                                  1004                                   │
└─────────────────────────────────────────────────────────────────────────┘
                                    │
                                    ▼
┌─────────────────────────────────────────────────────────────────────────┐
│   CALCULATES THE INDEPENDENT VARIABLE FOR THE MULTIPLE LINEAR REGRESSION MODEL │
│                                  1006                                   │
└─────────────────────────────────────────────────────────────────────────┘
                                    │
                                    ▼
┌─────────────────────────────────────────────────────────────────────────┐
│       GENERATE THE WEIGHTS USING MULTIVARIATE LINEAR REGRESSION TECHNIQUE │
│                                  1008                                   │
└─────────────────────────────────────────────────────────────────────────┘
                                    │
                                    ▼
┌─────────────────────────────────────────────────────────────────────────┐
│                  CALCULATES WEIGHT(Z) OF INDIVIDUAL BUCKET              │
│                                  1010                                   │
└─────────────────────────────────────────────────────────────────────────┘
                                    │
                                    ▼
┌─────────────────────────────────────────────────────────────────────────┐
│            FULL CIRCLE TRUST SCORE (FCTS) SCORE CALCULATION IS CALCULATED │
│                                  1012                                   │
└─────────────────────────────────────────────────────────────────────────┘
                                    │
                                    ▼
┌─────────────────────────────────────────────────────────────────────────┐
│  PROVIDE A FEEDBACK SYSTEM TO UPDATE THE WEIGHTS. THIS CAN BE IMPLEMENTED, │
│   WHENEVER A TRANSACTION HAPPENS IN THE ONLINE E-COMMERCE MARKETPLACE   │
│                                  1014                                   │
└─────────────────────────────────────────────────────────────────────────┘
```

METHODS AND SYSTEMS OF UTILIZING MACHINE LEARNING TO PROVIDE TRUST SCORES IN AN ONLINE AUTOMOBILE MARKETPLACE

CROSS-REFERENCE TO RELATED APPLICATIONS

This application claims priority to U.S. patent application Ser. No. 15/292,111 filed on Oct. 12, 2016. U.S. patent application Ser. No. 15/292,111 claims priority to U.S. Patent Application Ser. No. 62/239,975, filed on Oct. 12, 2015. U.S. patent application Ser. No. 15/292,111 claims priority to U.S. Patent Application Ser. No. 62/407,497, filed on Oct. 12, 2016. U.S. patent application Ser. No. 15/292,111 is hereby incorporated by reference in its entirety.

BACKGROUND

1. Field

This description relates to machine learning for optimizing e-commerce computing systems and methods and more particularly to a system, method and object of manufacture of machine learning to provide health scores in an online marketplace.

2. Related Art

It is noted that users may have used automobiles (or other vehicle type). The users may want to sell said automobiles to other buying parties such as used-automobile dealerships etc. The buyers may want to verify the status of the used automobile. In an online marketplace, inspecting the automobile may not be an option as the automobile may be too far to travel to perform the inspection. Also, inspection/verification methods should be consistent. Accordingly, standardized methods of automatically generating consistent and reliable ratings of used automobiles in an online marketplace are desired.

BRIEF SUMMARY OF THE INVENTION

In one example aspect, computerized method includes the step of providing an item listing. The item listing is listed in an e-commerce marketplace. The computerized method includes the step of identifying the item listing into a set of listing parameters. A listing parameter includes one or more listing images and one or more terms that are descriptive of the item listing. The computerized method includes using the listing parameters to do the following steps. The computerized method determines a trust score for the item listing. The trust score is based on a number of images of an item in the item listing. The computerized method a quality score of the number of images; a description score of a description of the item. The computerized method determines a pricing score. The pricing score is based on a percentage variation from a geographically relevant item valuation and an item research service, and a condition of the item. The computerized method determines a seller score. The seller score is based on the verified status of the seller, a seller rating of the seller, and a percentage of positive feedback. The computerized method determines a health score. The health score is based on a seller declaration, a service logs, a verification that the item is insured, and a verification that the item properly registered.

BRIEF DESCRIPTION OF THE DRAWINGS

FIG. 10 illustrates an example process for calculating weight calculations of parameters, according to some embodiments.

Figure 1:
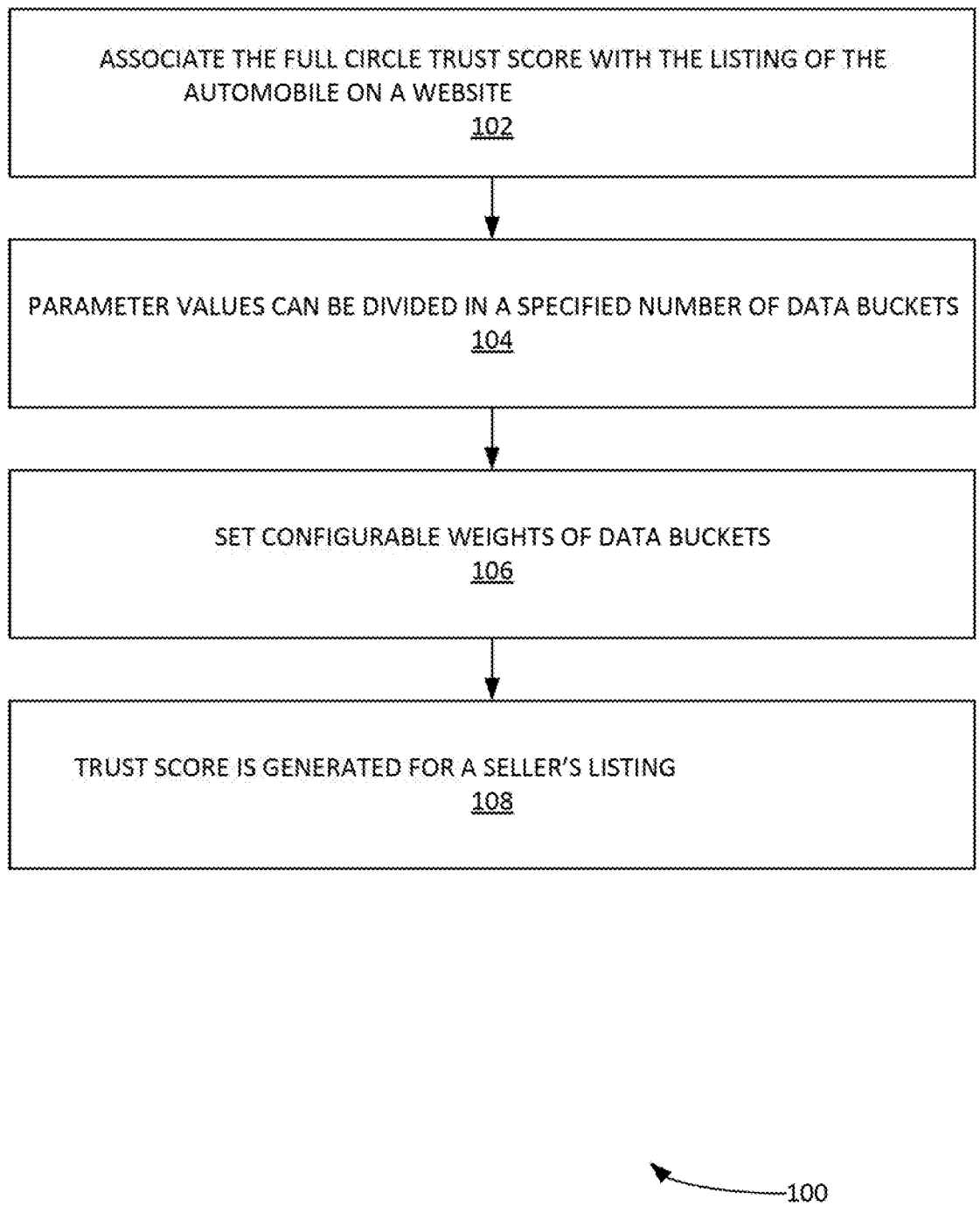
FIG. 1 illustrates an example system of modules for generating a full-circle health score for an online marketplace, according to some embodiments.

The Figures described above are a representative set, and are not an exhaustive set with respect to embodying the invention.

DESCRIPTION

Disclosed are a system, method, and article of providing health scores in an online marketplace. It is noted that other types of marketplaces can be used in other example embodiments. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment, 'an embodiment,' one example,' or similar language means that a particular feature, structure, or characteristic described in connection with the embodiment is included in at least one embodiment of the present invention. Thus, appearances of the phrases 'in one embodiment, 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart, diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

E-commerce can be trading in products or services using computer networks, such as the Internet. Electronic commerce draws on technologies such as mobile core commerce, electronic funds transfer, supply chain management, Internet marketing, online transaction processing, electronic data interchange (EDI), inventory management systems, and automated data collection systems.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alio: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Weighted average is the average of values which are scaled by importance. The weighted average of values is the sum of weights times values divided by the sum of the weights.

Online marketplace can be a type of e-commerce site where product or service information is provided by multiple third parties, whereas transactions are processed by the marketplace operator. Online marketplace can enable multichannel ecommerce.

Exemplary Methods

An online marketplace is provided. The online marketplace includes an information network accessed by computing or mobile or virtual reality devices. The online marketplace can enable two parties (e.g. a buyer and a seller) to enter into an online transaction. In one example, the online marketplace can enable transactions of used items and/or service(s). It is noted that other example embodiments, the online marketplace can also enable transaction that include first-hand/new items.

The purchase of a used and/or new items may be a high value financial transactions for a user. Accordingly, the trust (e.g. health) factor may be important for the transaction to be successful. For example, when two parties whether known to each other or unknown are trying to transact, the transaction suffers from information asymmetry and moral hazard. Because of this, trade velocity can slow down, as it takes longer to establish trust and transparency for transaction to take place. Accordingly, the online marketplace can include one or more trust factors that enable buyers to make more informed decisions.

One example of a process that increases a user's trust factor can be a health score. The health score can be based on account trust factors, such as auto inspection information, warranty information, verified seller information, attractiveness of pricing for buyer information, and/or level of disclosures by the sellers. The health score can enable buyers to develop more objective assessment and comfort around the items they are considering buying. The information can also enable sellers who want to adopt best practices and offer nothing but the best to the buyer community. Seller listings with higher health scores can be automatically ranked higher in the online marketplace.

FIG. 1 illustrates an example process 100 of modules for generating a full-circle health score for an online marketplace, according to some embodiments. In process 100, a full-circle health score is generated for a seller's listing. The health score is built on best practices in buying and selling. Accordingly, any practice that assists a buyer's interest can be included into process 100. In one example implemented by process 100, while a seller creates a listing for the sale of an items, the seller is asked an exhaustive set of questions/information regarding the item (e.g. by a functionality operating in a server system that implements process 100). Some of the questions can be mandatory for the seller to answer. Examples of mandatory fields and explanations can include, inter alia, images of the listing. This can be mandatory, as, at least one image is to be uploaded. However, the number of images the seller uploads, the higher the seller's transparency score bucket can be. An example of an optional field can be a copy of service logs. This can be an optional field, however if the seller uploads the service logs, he can further increase his health score. This is due to the fact that he is providing more trust related documents. Other questions may voluntary but the answers may improve the health score. The information obtained from the seller can then be translated into parameter values. Parameter values can also be obtained from other sources (e.g. third-party entities, etc.). The parameters values can be used to calculate the health score. In one example, twenty-four (24) factors can be taken into account when calculating the health score.

In step 102, a health score can be associated with a listing of an item on website managed by the online market that implements process 100. In step 104, these parameter values can be divided in a specified number of data buckets (e.g. four (4) buckets). Example data buckets can include, inter alia: a transparency score, a seller score, health score, a pricing score, etc. In step 106, these data buckets (e.g. the four buckets) can have different configurable weights. The weights can be determined by several factors. Additionally, geography, marketplace, and/or seasonality can also be taken into account. For example, during a festive season in India, pricing score can have a higher weight. The parameter values can also have configurable weightages. In 108, the health score calculated on the aggregated scores of the various data buckets mentioned above. The aggregated score can be the full-circle health score. The full-circle health score can capture the three-hundred and sixty (360) degree information revolving around trust of the listing in any marketplace. It is noted that process 100 (as well as other processes and systems provided herein) can be expanded to any category possible in the marketplace.

Figure 2:
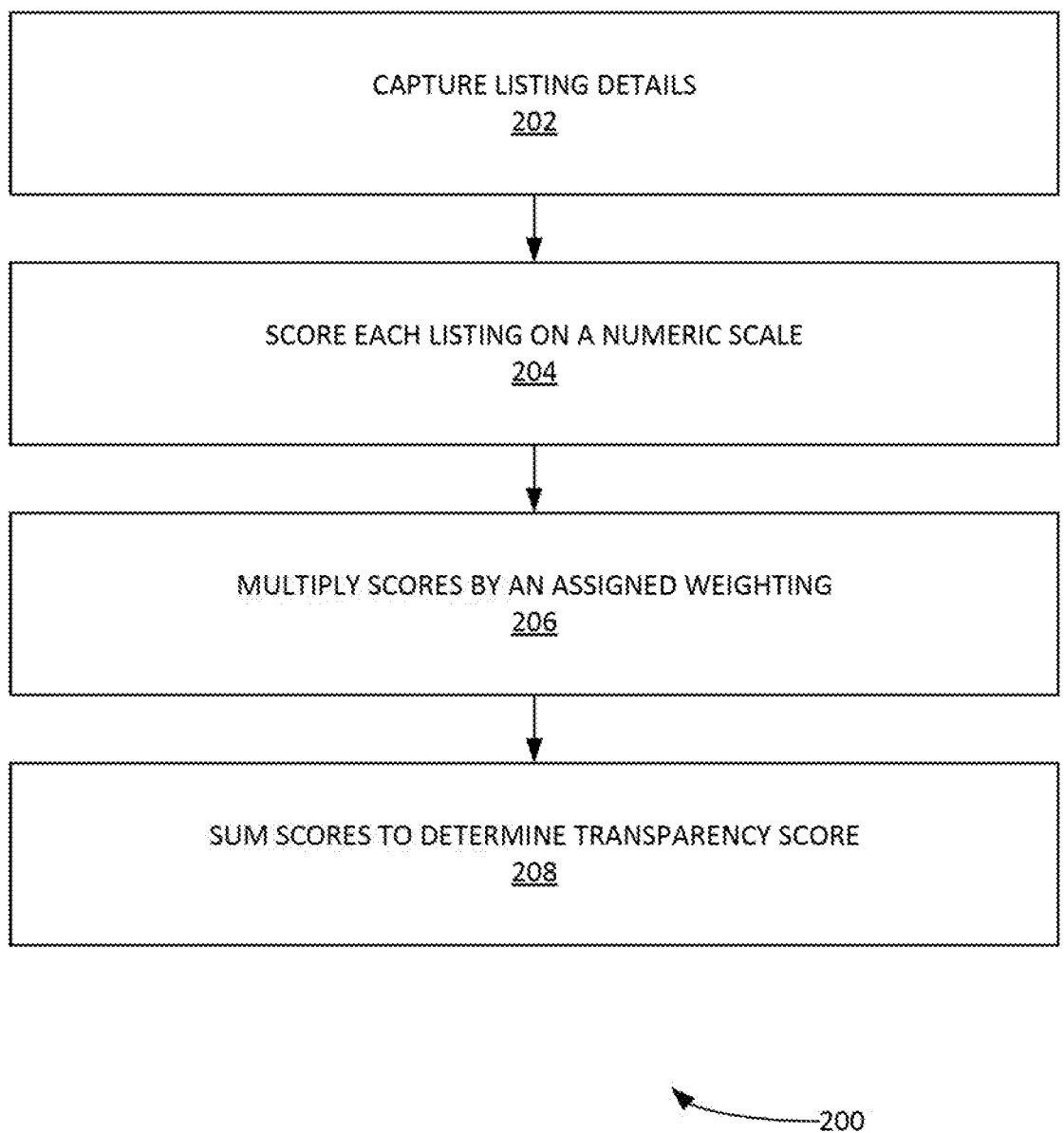
FIG. 2 illustrates an example process of generating a transparency score, according to some embodiments.

FIG. 2 illustrates an example process 200 of generating a transparency score, according to some embodiments. In step 202, the listing of the item can be analyzed. For example, various details can be obtained from the list. The listing can be marked based on the following parameters, inter alia: number of images; quality of images; description; basic facts; key factors; available options; etc. In step 204, each listing parameter can be scored. For example, the scores would be captured on a scale of zero (0) to ten (10). In step 206, these scores can be multiplied by the pre-assigned weights. In step 208, these scores can be summed to determine a transparency score.

Figure 3:
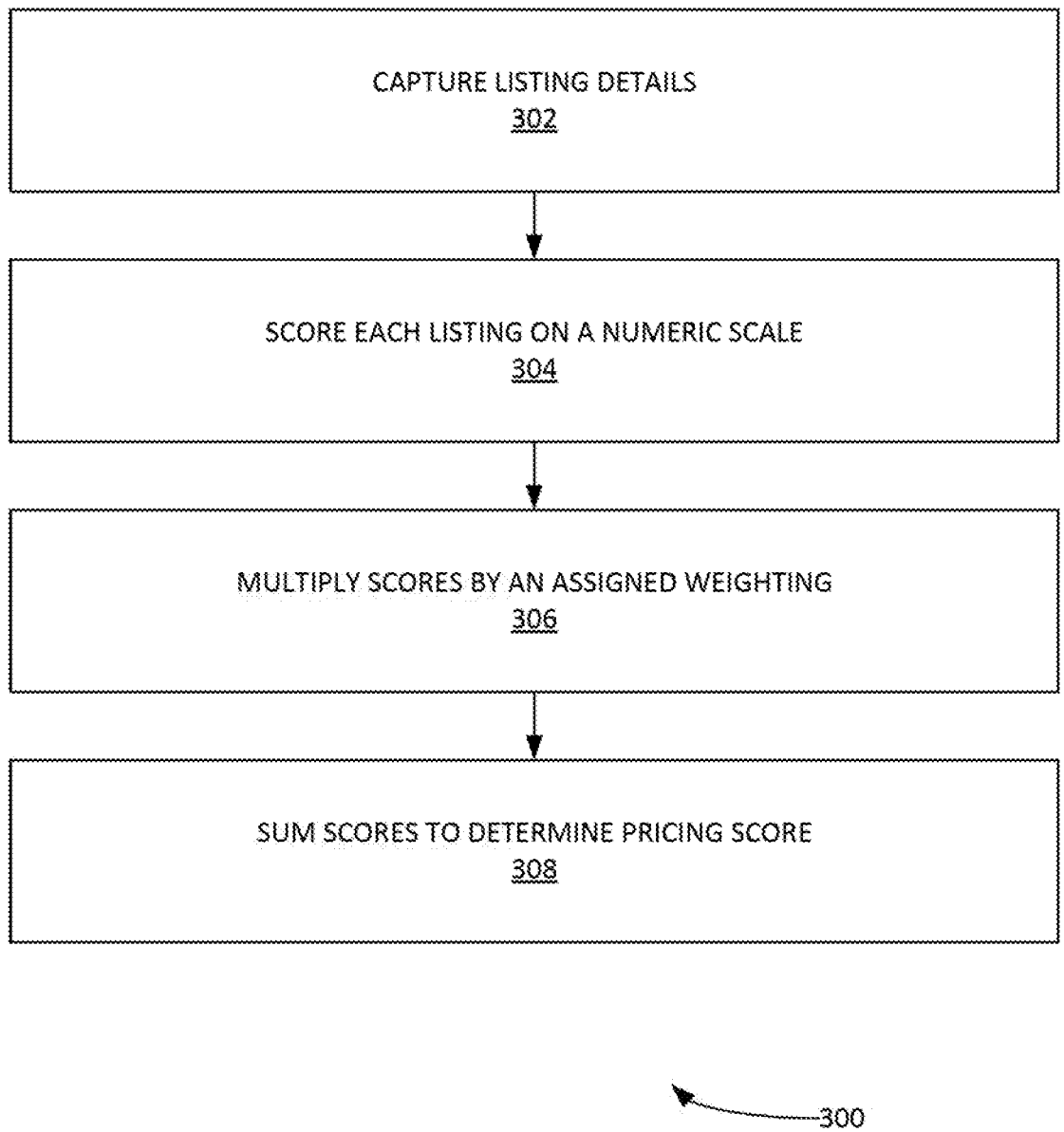
FIG. 3 illustrates an example process of generating a pricing score, according to some embodiments.

FIG. 3 illustrates an example process 300 of generating a pricing score, according to some embodiments. In step 302, the listing of the item can be analyzed. For example, various details can be obtained from the list. The listing can be marked based on the following parameters, inter alia: percentage variation from a geographically relevant item valuation and item research service (e.g. via an API); condition of item; percentage variation from median; percentage of listings below the price quoted; etc. In step 304, each listing parameter can be scored. For example, the scores would be captured on a scale of zero (0) to ten (10). In step 306, these scores can be multiplied by the pre-assigned weights. In step 308, these scores can be summed to determine a pricing score.

Figure 4:
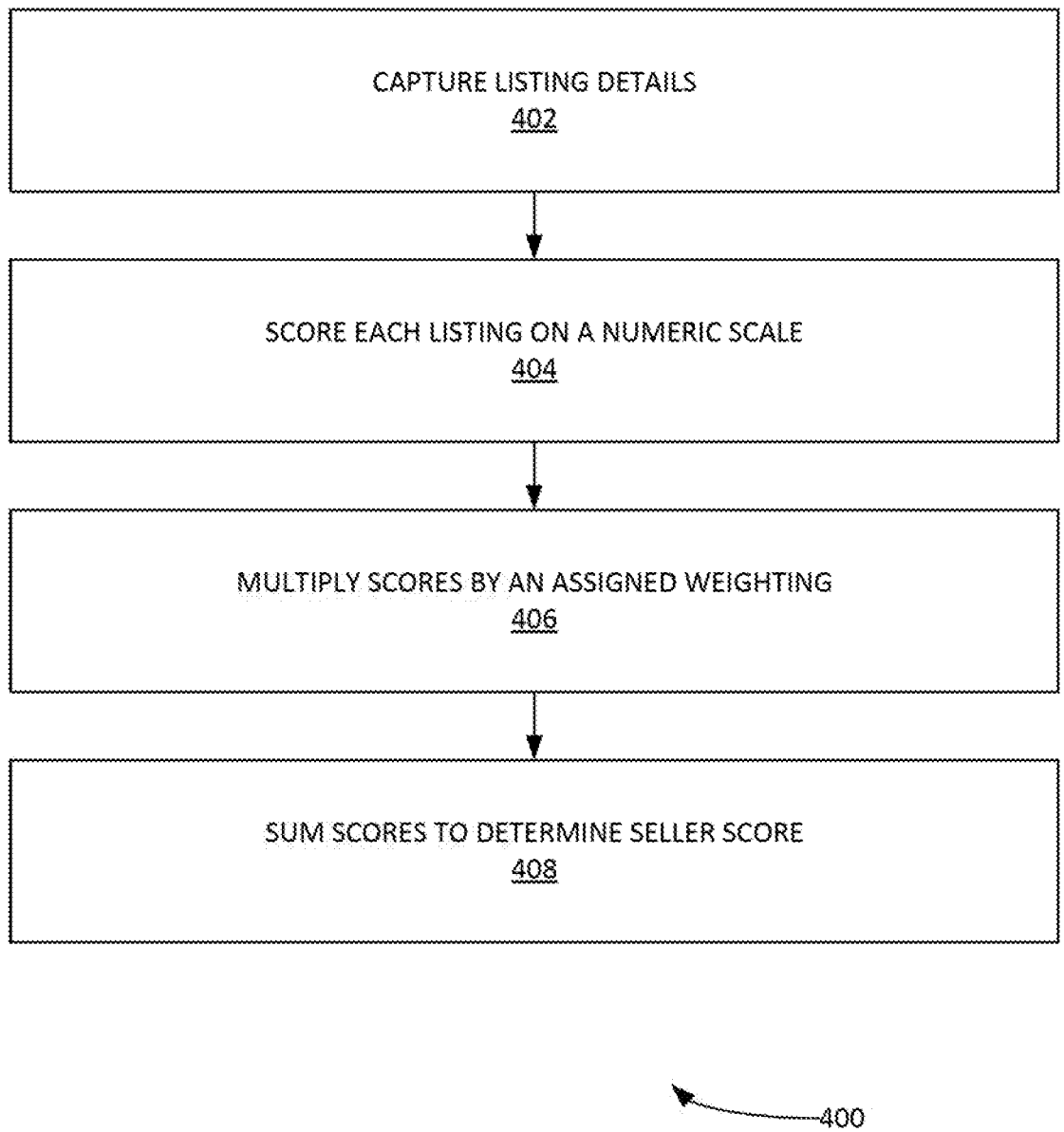
FIG. 4 illustrates an example process of generating a seller score, according to some embodiments.

FIG. 4 illustrates an example process 400 of generating a seller score, according to some embodiments. In step 402, the listing of the item can be analyzed. For example, various details can be obtained from the list. The listing can be marked based on the following parameters, inter alia: verified seller; pro seller (e.g. basic or premium); seller rating; seller engagement score; showroom score; dealership score; percentage of positive feedback; etc. In step 404, each listing parameter can be scored. For example, the scores would be captured on a scale of zero (0) to ten (10). In step 406, these scores can be multiplied by the pre-assigned weights. In step 408, these scores can be summed to determine a seller score.

Figure 5:
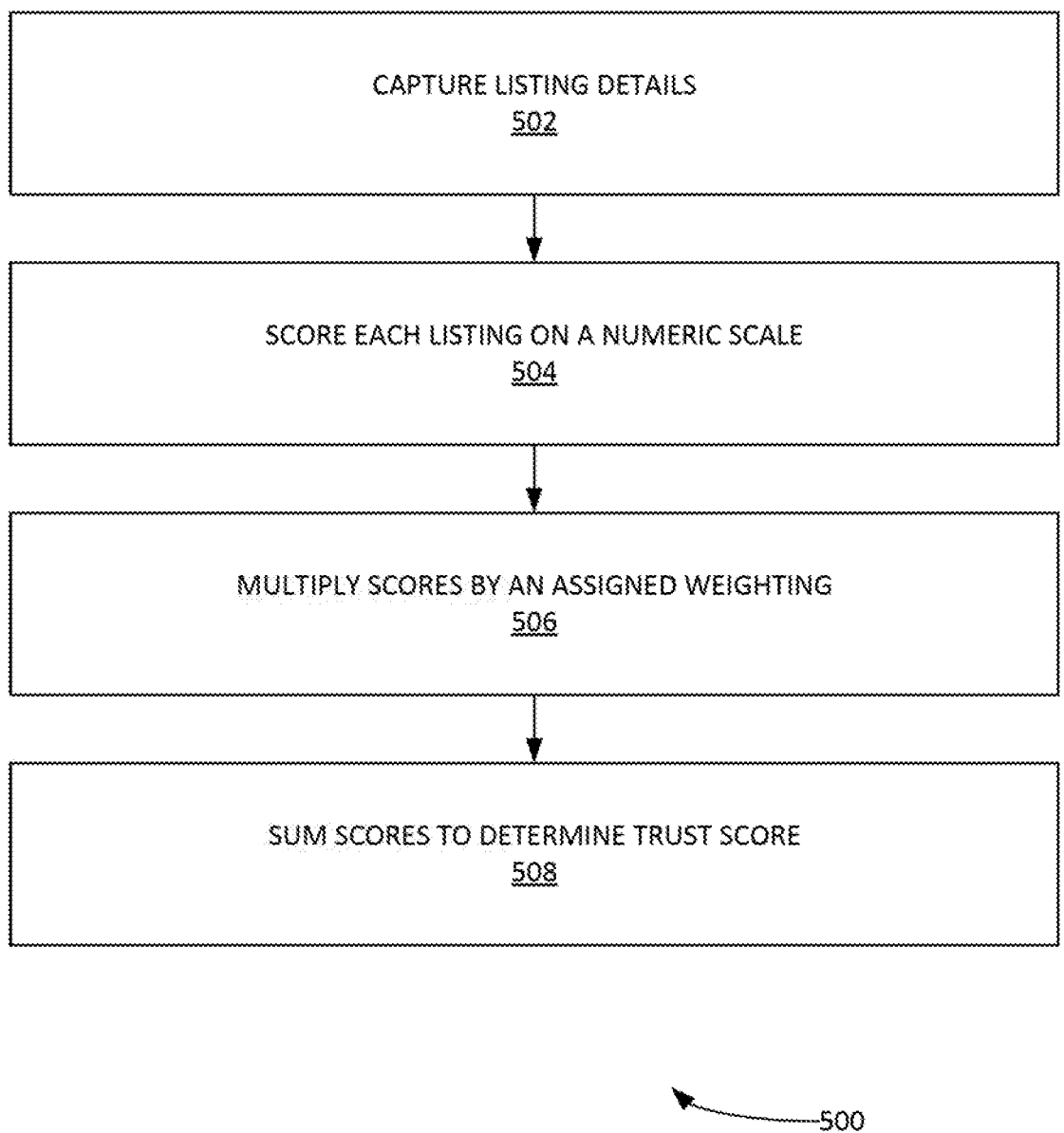
FIG. 5 illustrates an example process of generating a health score, according to some embodiments.

FIG. 5 illustrates an example process 500 of generating a health score (e.g. in a used automobile marketplace example), according to some embodiments. In step 502, the listing of the automobile can be analyzed. For example, various details can be obtained from the list. The listing can be marked based on the following parameters, inter alia: inspection report; warranty; certification; seller declaration; service logs; copy of insurance; copy of registration certificate (RC). An RC can be a vehicle registration certificate (e.g. an official document providing proof of registration of a motor vehicle). In step 504, each listing parameter can be scored. For example, the scores would be captured on a scale of zero (0) to ten (10). In step 506, these scores can be multiplied by the pre-assigned weights. In step 508, these scores can be summed to determine a health score.

Additional Exemplary Computer Architecture and Systems

Figure 6:
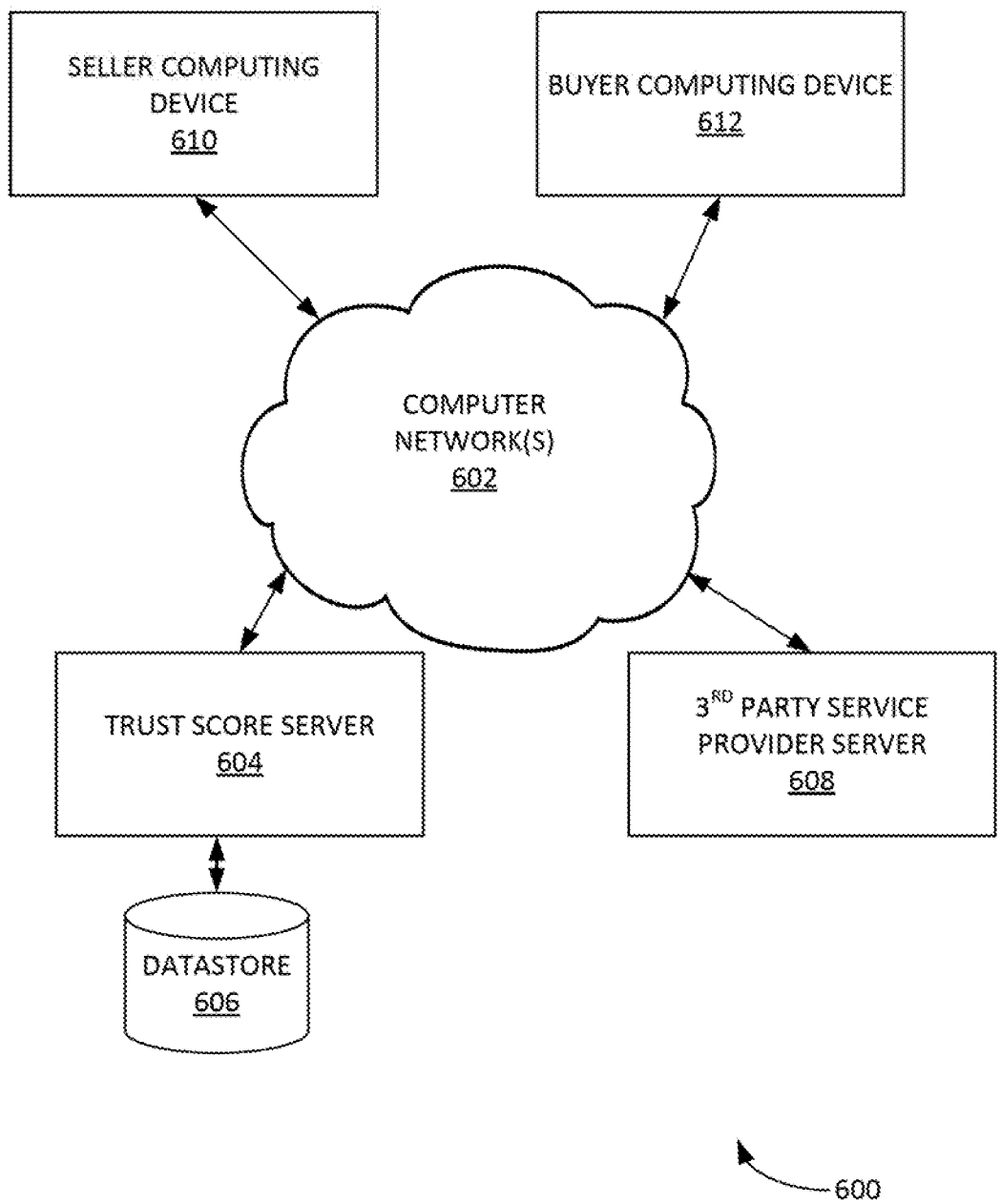
FIG. 6 illustrates a computer system for providing health scores in an online marketplace, according to some embodiments.

FIG. 6 illustrates a computer system 600 for providing health scores in an online marketplace, according to some embodiments. System 600 can include various computer networks 602 (e.g. the Internet, a local area network, a cellular data network, etc.). Health score server 604 can be accessed via computer networks 602. Health score network 604 can also access other services via computer networks 602. Health score server 604 can provide health scores in an online marketplace. In some examples, health score server 604 can implement and manage an online marketplace as well. Health score server 604 can include various functionalities for implementing the various processes and/or systems provided herein (e.g. a database manager, calculators, image recognition engines, web servers, etc.). Health score server 604 can implement process 100-500. Health score server 604 can query third-party entity servers 608 to obtain information to implement processes 100-500. Health score server 604 can, store data in datastore 606 (e.g. data related to processes 100-500, etc.). Health score server 604 can receive and respond to queries for health scores from seller computing device 610. Health score server 604 can receive and respond to queries for health scores from user computing device 612.

Figure 7:
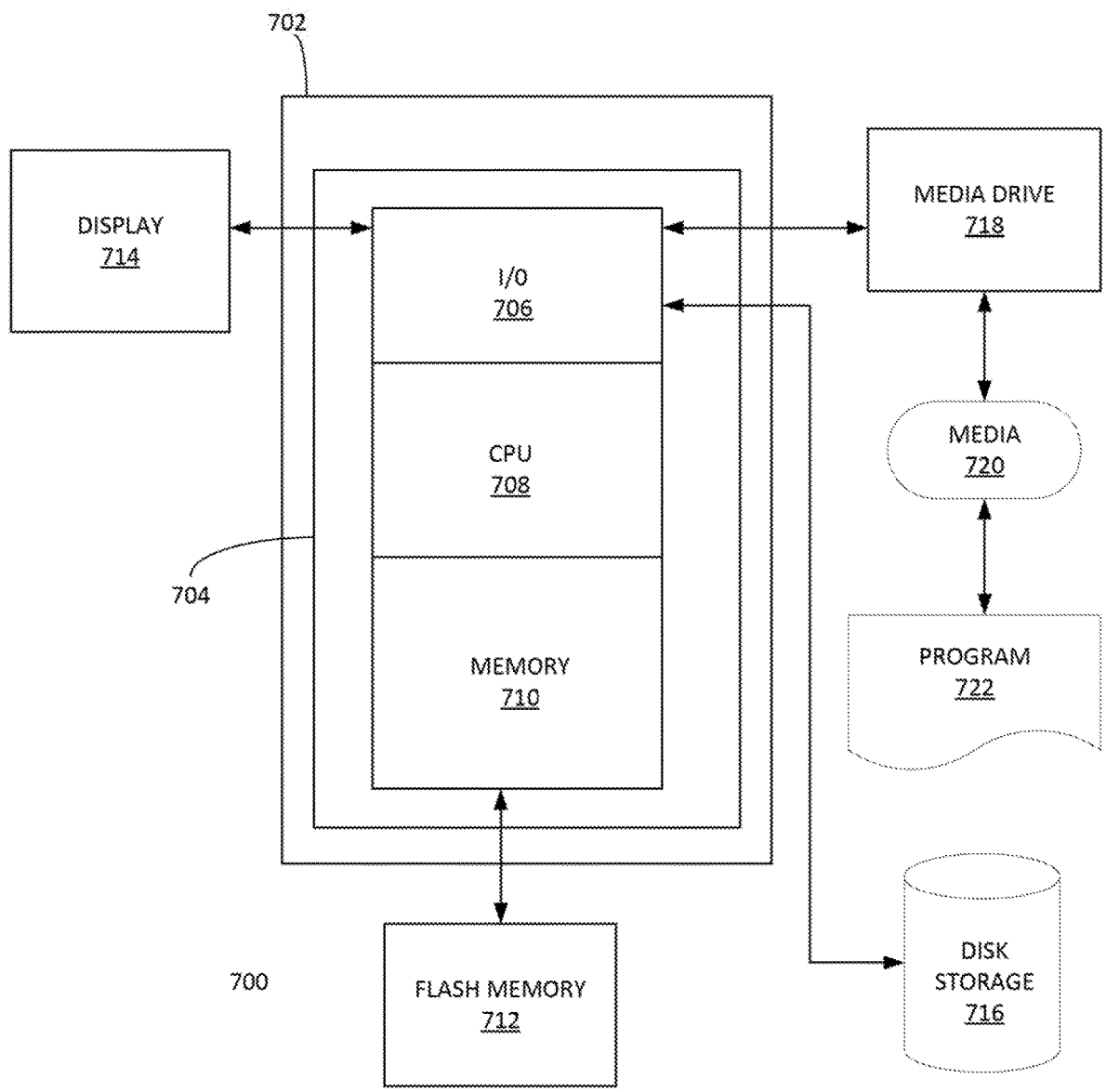
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 8:
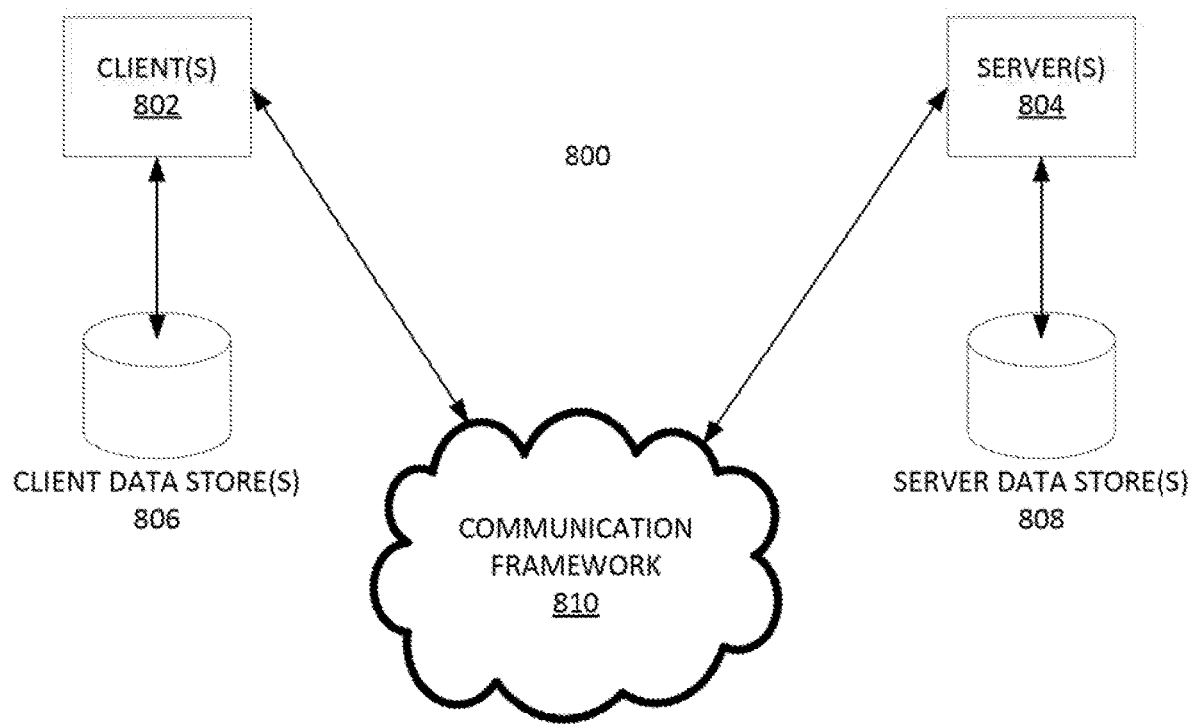
FIG. 8 is a block diagram of a sample-computing environment that can be utilized to implement various embodiments.

FIG. 8 is a block diagram of a sample-computing environment 800 that can be utilized to implement various embodiments. The system 300 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 may be in the form of a data packet adapted to be transmitted between two or more computer processes. The system 800 includes a communication framework 810 that can be employed to facilitate communications between the client(s) 302 and the server(s) 804. The client(s) 802 are connected to one or more client data store(s) 806 that can be employed to store information local to the client(s) 802. Similarly, the server(s) 804 are connected to one or more server data store(s) 808 that can be employed to store information local to the server(s) 804. In some embodiments, system 800 can instead be a collection of remote computing services constituting a cloud-computing platform.

ADDITIONAL EMBODIMENTS

Figure 9:
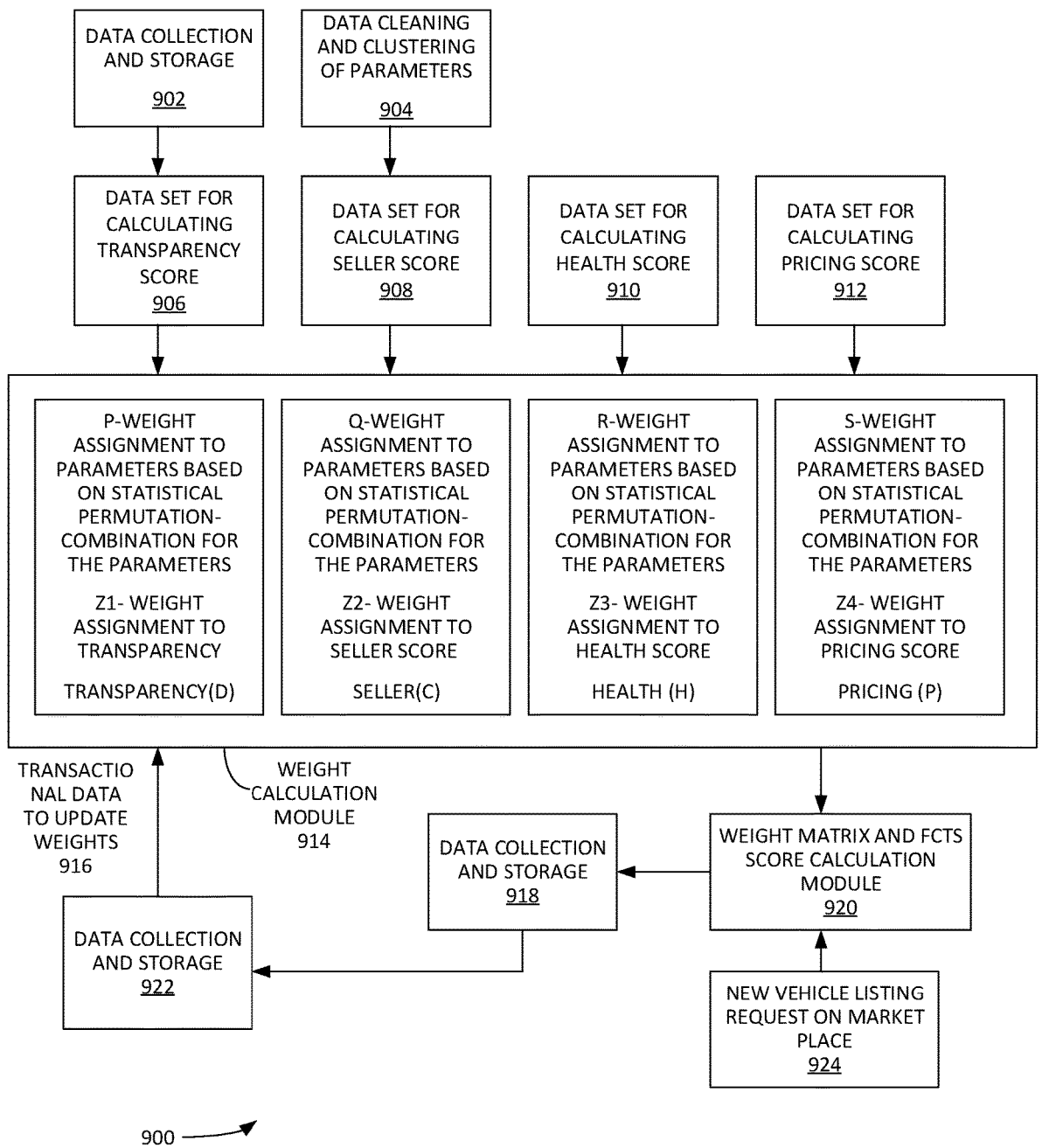
FIG. 9 illustrates an example process for utilizing machine learning to provide trust scores in an online automobile marketplace, according to some embodiments. Process 900 can use machine learning.

FIG. 9 illustrates an example process 900 for utilizing machine learning to provide trust scores in an online automobile marketplace, according to some embodiments. Process 900 can use machine learning. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alio: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

In step 902, process 900 implements data collection and storage (e.g. Online vehicle Marketplace Listing Data, Sellers data. In one example, step 902, a Mongo™ Data base architecture is used for storage.

In step 904, process 900 can implement Data Cleaning and Clustering of parameters. This can include, inter alia: Handling Duplicate Values; Missing Values Treatment (e.g. the rows were either deleted, replaced with modes or means based on the suitability for each of the column, etc.); finding correlation between the parameters to identify influencing parameters for scoring; etc. Example databases utilized can include, inter alia: data set for calculating transparency score 906; data set for calculating seller score 908; data set for calculating health score 910; data set for calculating pricing score 912; etc. In step 914, a Weight calculation module can be implemented.

Weight calculation module can calculate the following parameters. The pricing score can include, inter alia: % variation from OBV; vehicle condition; % variation from medium; s3% of listing below your price; etc. The health score can include, inter alia: kilometers driven per year; warranty and certification; test drive; returns; seller declaration; etc. The seller score can include, inter alia: verified seller (email and/or phone; past transaction history availability; etc. The transparency score can include, inter alia: number of images uploaded; quality of images; description; video uploaded; history report availability; basic factors inputs availability; key factors inputs availability's copy of service logs; copy of insurance; etc.

In step 916, process 900 can use the transactional data to update weights. This can utilize a list of transaction(s) of the listing through marketplace 922. Transaction(s) of the listing through marketplace 922 can be developed as follows. In step 924, a new vehicle listing request can be placed on the marketplace. In step 920, process 900 can implement a weight matrix and FCTS score calculation module 920. In step 918, process 900 can implement a score assignment to the product on marketplace listing.

FIG. 10 illustrates an example process 1000 for calculating weight calculations of parameters, according to some embodiments. In step 1002, based on historical sales data, weights assignments of listing parameters values are calculated using Multivariate Regression Modeling. In step 1004, process 1000 splits the data set into a training set(s) (e.g. training_set), a test set(s) (e.g. test_set), etc. In step 1006, process 1000 calculates the independent variable. In one example, the independent variable=(Transaction date of the vehicle)−(Listing creation date. Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

In step 1008, process 1000 can generate the weights using multivariate linear regression technique. For example:

$$Y=[y]$$

$$[X]=[S_1 \ldots S_n, R_1 \ldots R_n, Q_1 \ldots Q_n, P_1 \ldots P_n]*[W_1 \ldots W_n]+[\varepsilon \ldots \varepsilon_n]$$

where Y is the output required, $[X]=n^{th}$ order matrix of total number of Independent variables.

$[\varepsilon]$=matrix of residual function.

$\varepsilon=\Sigma$ (observed value—predicted value).

To Calculate the saturation point for residual function gradient descent method is applied using partial derivative, which is defined as:

$$\partial/\partial\varepsilon=1/n*\Sigma_i(y-(X*W+\varepsilon_i))^2$$

where the value of "i" is varying from 0, n.

To achieve the value for each residual point above equation is iterated from 0 to n.

In step 1010, process 1000 calculates Weight(Z) of individual bucket. For example, parameters belongs to a bucket (e.g. Health Score) are scaled to create the overall bucket score of ten (10).

In step 1012, a Full Circle Trust Score (FCTS) score calculation is calculated. This can be total score is calculated using the equation/weights calculated in step 1008.

In step 1014, process 1000 provides a feedback system to update the weights. This can be implemented, whenever a transaction happens in the online e-commerce marketplace. Transaction data can be pushed in regular interval to re-calculate the weights.

Additional Discussion of FCTS

It is noted that the FCTS is based on the technologies, systems and algorithms that consider trust factors that are important while buying used automobiles, such as, auto inspection, warranty, verified seller, attractiveness of pricing for buyer, and level of disclosures by the sellers. The FCTS can enable buyers to develop more objective assessment and comfort around the vehicles they are considering buying. The FCTS is equally attractive for sellers who want to adopt best practices and offer nothing but the best to the buyer community. Seller listings with higher trust score can automatically emerge as winners on the online vehicle marketplace.

The FCTS can have the following components. A transparency score can be provided. This score is based on listing details disclosed by Seller, such as Number of Images, Quality of Images, Description, etc.

A pricing score can be provided. This score is based on the listing price relative to market price of similar vehicles and an algorithmic pricing engine (e.g. Orange Book Value, etc.).

A seller score can be provided. Every seller is unique, hence this score is based on seller related factors such as the Ratings given to them by buyers, whether the seller is verified or not, etc.

A health score can be provided. Every seller may be trustworthy, but this score is based on factors which enhance trust on the vehicle such as inspection report, warranty, Kms driven etc.

The FCTS can have the following elements. Verified sellers can be utilized in a quantified manner. Every information is fully verified, and the sellers are issued Verified Seller badge that are visible to buyer. Also, the system cross verifies more detailed information for professional sellers/dealers.

An inspection report is provided. The system offers independent, objective and unbiased automobile inspection reports. These reports are independent and follow inspection methodology, thus do not favor a seller. A reputed partner of the system performs the inspection and prepares the report.

A seller declaration is provided. For every item that is being sold by an individual or professional seller/dealer, the system asks every seller to fill a seller declaration form on self-disclosure basis. This form is uniquely designed so that seller can disclose any unknown problems in the automobile they are selling. This process adds great level of transparency in the buying process for the buyer. In case the seller is not truthful or fully transparent, the inspection report can reveal whether the seller declaration is passing or failing.

A set of listings are provided. The listing provides for higher trust, safety and convenience. Ratings and/or reviews are provided. The buyer can read product and seller ratings and reviews to make more informed decision. The buyer can also rate the seller from whom he bought an item or can rate the product bought. If a buyer does not have a good experience or did not like the product, he can rate the seller or the product accordingly. Because all users get to see the ratings and reviews for all the seller and the products, it makes buyers more informed.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of providing health scores in an online marketplace comprising:
   providing, with at least one computer processor, an item listing, wherein the item listing is listed in an e-commerce marketplace;
   identifying the item listing into a set of listing parameters, wherein each listing parameter comprises one or more listing images and one or more terms that are descriptive of the item listing, wherein the listing parameter is based on an image of an automobile uploaded by a user;
   based on historical sales data, calculating a set of weights assignments of the set of listing parameters, with a Multivariate Regression model by:
   splitting the historical sales data into a training set and a test set, generating the weights assignments using a multivariate linear regression process, and applying the weights assignments to the listing parameters; and using the listing parameters to:

determine a trust score for the item listing, wherein the trust score is based on a number of images of an item in the item listing, a quality score of the number of images, and a description score of a description of the item, wherein the trust score is determined using a specified machine learning algorithm comprising at least one artificial neural network, and, wherein the trust score is further based on a set of basic facts about the item, a set of key factors of the item, and a list of available options for purchasing the item;

determine a pricing score, wherein the pricing score is based on a percentage variation from a geographically relevant item valuation and an item research service, and a condition of the item, and wherein the pricing score is based on a listing price relative to a market price of a similar automobile and an algorithmic pricing engine, and wherein the pricing score is further based on a percentage variation from median price of a set of items that are in a same class as the item and a percentage of other current item listings of the set of items that are below a quoted price in the item listing;

determine a seller score, wherein the seller score is based on the verified status of the seller, a seller rating of the seller, and a percentage of positive feedback, and wherein every seller is unique, hence this score is based on seller related factors comprising the Ratings given to the seller by buyers, whether the seller is verified or not, and, wherein the seller score is further based on a seller engagement score, a showroom score, and a dealership score; and determine a health score, wherein the health score is based on a seller declaration, a service log, a verification that the item is insured, and a verification that the item is properly registered, and wherein the health score is based on factors which enhance trust on the automobile including an inspection report and a warranty, wherein the item comprises a used automobile, and wherein the pricing score is further based on a percentage variation from median price of a set of items that are in a same class as the item and a percentage of other current item listings of the set of items that are below a quoted price in the item listing.

2. The computerized method of claim 1 further comprising:

generating a full-health score based on a weighted average of the trust score, the pricing score, the seller score and the health score.

3. A server system comprising:

a processor configured to execute instructions;

a memory containing instructions which, when executed on the processor, cause the processor to perform operations that:

provide, with at least one computer processor, an item listing, wherein the item listing is listed in an e-commerce marketplace;

identify the item listing into a set of listing parameters, wherein each listing parameter comprises one or more listing images and one or more terms that are descriptive of the item listing, wherein the listing parameter is based on an image of the automobile uploaded by a user;

based on historical sales data, calculate a set of weights assignments of the set of listing parameters values with a Multivariate Regression model by:

splitting the historical sales data into a training set and a test set, generating the weights assignments using a multivariate linear regression process, and applying the weights assignments to the listing parameters; and using the listing parameters to:

determine a trust score for the item listing, wherein the trust score is based on a number of images of an item in the item listing, a quality score of the number of images, and a description score of a description of the item, wherein the trust score is determined using a specified machine learning algorithm comprising at least one artificial neural network, and wherein the trust score is further based on a set of basic facts about the item, a set of key factors of the item, and a list of available options for purchasing the item;

determine a pricing score, wherein the pricing score is based on a percentage variation from a geographically relevant item valuation and an item research service, and a condition of the item, and wherein the pricing score is based on a listing price relative to a market price of a similar automobile and an algorithmic pricing engine, and wherein the pricing score is further based on a percentage variation from median price of a set of items that are in a same class as the item and a percentage of other current item listings of the set of items that are below a quoted price in the item listing;

determine a seller score, wherein the seller score is based on the verified status of the seller, a seller rating of the seller, and a percentage of positive feedback, and wherein every seller is unique, hence this score is based on seller related factors comprising the Ratings given to the seller by buyers, whether the seller is verified or not, and wherein the seller score is further based on a seller engagement score, a showroom score, and a dealership score; and determine a health score, wherein the health score is based on a seller declaration, a service log, a verification that the item is insured, and a verification that the item is properly registered, and wherein the health score is based on factors which enhance trust on the automobile including an inspection report and a warranty, wherein the item comprises a used automobile, and wherein the pricing score is further based on a percentage variation from median price of a set of items that are in a same class as the item and a percentage of other current item listings of the set of items that are below a quoted price in the item listing.

4. The server system of claim 3, wherein the trust score is further based on a set of basic facts about the item, a set of key factors of the item, and a list of available options for purchasing the item.

5. The server system of claim 4, wherein the seller score is further based on a seller engagement score, a showroom score, and a dealership score.

* * * * *